United States Patent
Dafcik

(10) Patent No.: US 7,027,803 B2
(45) Date of Patent: Apr. 11, 2006

(54) METHOD FOR TRANSMITTING INFORMATION

(75) Inventor: Juan Dafcik, Neufahrn (DE)

(73) Assignee: Siemens Aktiengesellschaft, Munich (DE)

( * ) Notice: Subject to any disclaimer, the term of this patent is extended or adjusted under 35 U.S.C. 154(b) by 559 days.

(21) Appl. No.: 10/332,534

(22) PCT Filed: Jul. 12, 2001

(86) PCT No.: PCT/DE01/02614

§ 371 (c)(1),
(2), (4) Date: Jan. 10, 2003

(87) PCT Pub. No.: WO02/05526

PCT Pub. Date: Jan. 17, 2002

(65) Prior Publication Data

US 2004/0023673 A1 Feb. 5, 2004

(30) Foreign Application Priority Data

Jul. 12, 2000 (DE) .............................. 100 33 729

(51) Int. Cl.
*H04M 11/00* (2006.01)
*H04B 7/00* (2006.01)
(52) U.S. Cl. .............................. 455/414.1; 455/414.2; 455/404.1; 455/456.3; 455/507; 455/518; 455/519

(58) Field of Classification Search ........... 379/202.01, 379/67.1, 33, 35, 36, 37, 38, 39, 40, 41; 455/418, 455/419, 420, 425, 435.1, 435.2, 440, 457, 455/507, 508, 519, 518, 404.2, 456.3, 456.1
See application file for complete search history.

(56) References Cited

U.S. PATENT DOCUMENTS

| 5,596,633 A | | 1/1997 | Meier et al. | |
| 5,727,052 A | * | 3/1998 | Sizer et al. | ............ 379/142.01 |
| 5,940,767 A | | 8/1999 | Bourgeouis et al. | |

FOREIGN PATENT DOCUMENTS

| EP | 0542118 | 5/1993 |
| WO | 9409599 | 4/1994 |
| WO | 9839941 | 9/1998 |

* cited by examiner

*Primary Examiner*—Rexford Barnie
(74) *Attorney, Agent, or Firm*—Harness, Dickey & Pierce, P.L.C.

(57) ABSTRACT

A method is for transmitting information within a user group. Communication terminals, which are registered with a central communication device, are assigned to the individual users of the group. Information for the members of the group is stored in the central communication device. The information is then transmitted to the communication terminal via an interface device, or is issued on an output device, as soon as the user concerned enters the range of the interface device and/or the output device.

40 Claims, 1 Drawing Sheet

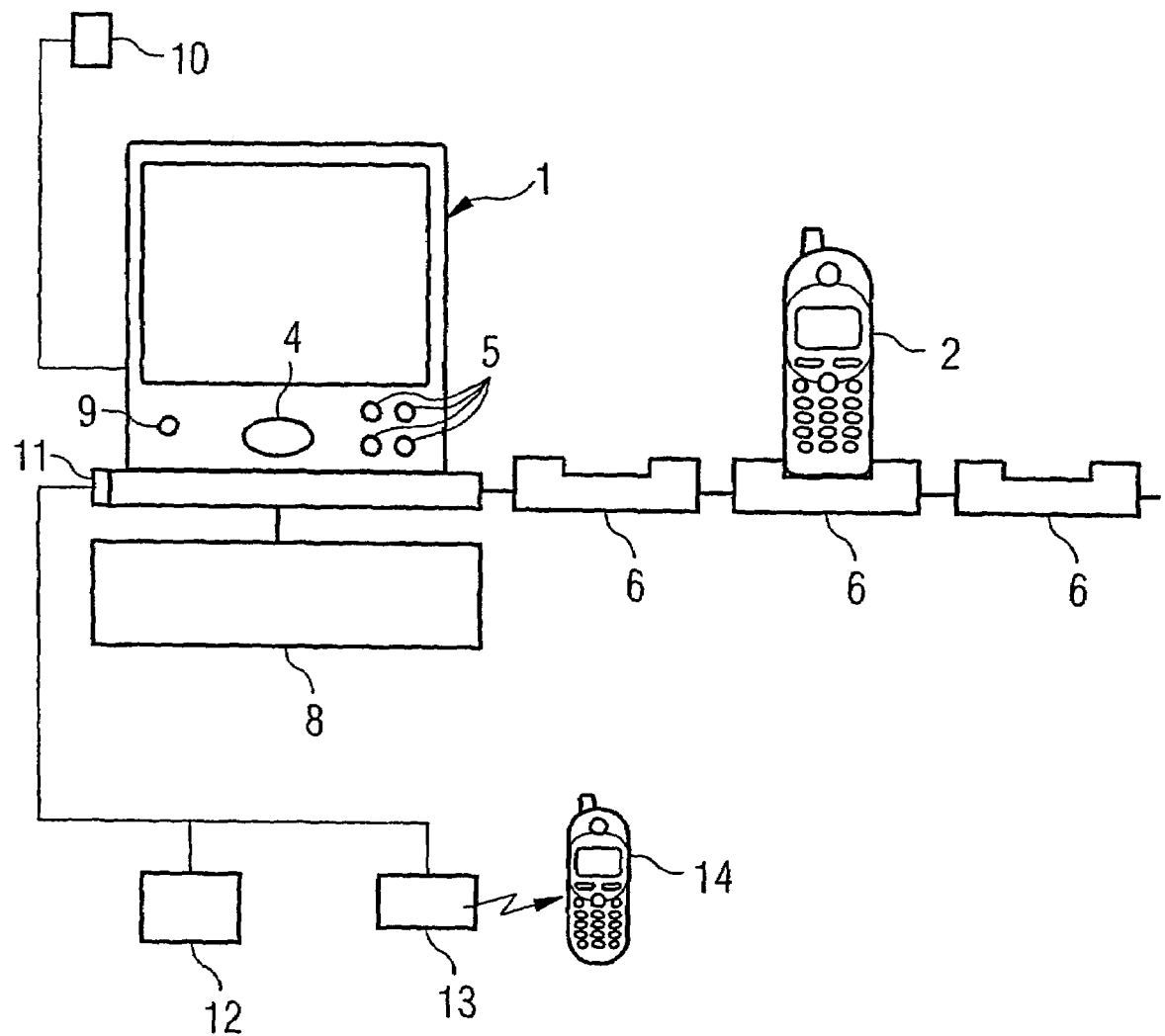

METHOD FOR TRANSMITTING INFORMATION

This application is the national phase under 35 U.S.C. § 371 of PCT International Application No. PCT/DE01/02614 which has an International filing date of Jul. 12, 2001, which designated the United States of America and which claims priority on German Patent Application number DE 100 33 729.5 filed Jul. 12, 2000, the entire contents of which are hereby incorporated herein by reference.

1. Field of the Invention

The invention generally relates to a method for transmitting information within a user group. The invention furthermore generally relates to a central communication device for carrying out the method.

2. Background of the Invention

With a method or a device respectively, as is known from EP-A-0 542 118, it is however necessary for a user to actively perform actions to ensure that he receives the information stored for him as part of a user group.

It is furthermore known from U.S. Pat. No. 5,596,633 to determine the presence of a registered communication terminal at a location, wherein a transmission and/or output of information is performed for the user if the communication terminal of the respective user is determined as present.

In general it should be pointed out that more and more people are using mobile phones or pagers in order to be constantly contactable by telephone for other people, or at least to be able to exchange or at least receive data, for example short messages. Likewise, more and more people are using "PDAs" (Personal Digital Assistants) for their daily organization for storing addresses, as a notebook, etc. The latest developments tend toward the convergence of mobile radio devices and PDAs in such a way that in the future, usually only one device which has both the functions of a mobile radio device and the full range of features of a PDA will be required. Owing to their ever easier operation, the devices are increasingly also being used by persons who are not particularly technically oriented or informed.

Despite the widespread use of these devices, it is usually the case that in groups that have a common local point of contact at which various members of the group are present at different times of day, information is exchanged between the members of the group by leaving notes for another member of the group at the location. In the case of information that relates to the whole group, this note is pinned up centrally on a noticeboard for example.

A typical example of such a small defined group is a family, a residential community, or a group of co-workers in an office. However, this "communication by notes" is often not very effective since members of the group frequently overlook the messages of the others. Although in many groups virtually all the members of the group have their own communication terminal, the means of communication (SMS or voice mobile radio) available therewith are usually not utilized for the regular communication among members of the group. This is because either it is necessary to continually establish connections to the individual members of the group, or any group functions provided by the communication terminals are too complicated for the inexperienced user.

SUMMARY OF THE INVENTION

An object of an embodiment of the present invention is to provide a modern, reliable and convenient method for transmitting information or for exchanging information within such a group, in which the communication terminals used by the members of the group are utilized. It is a further object of an embodiment of the invention to provide a central communication terminal for carrying out the method.

In accordance with the method according to an embodiment of the invention, first of all the respective communication terminals of the users belonging to the user group must be registered with a central communication terminal. This can be done, for example, at any time in a special registration mode of the respective communication terminal or of the central communication device respectively. In the case where a system, which includes for example, a central communication device and a plurality of matching communication terminals, is purchased together, the registration can also be performed in the factory. Incidentally, in the text below, the term "communication terminal" encompasses all the devices mentioned previously that have a suitable interface for communicating with other devices.

The information is then exchanged or transmitted in the following manner:

First of all the information must be stored in the central communication device by use of the keyboard, for example, wherein the information is assigned to the whole user group or to a subgroup or to specific individual users of the user group. The information storage is possible at any time and can be performed either actively by an operator of the central communication device, or from another communication terminal. Likewise, the central communication terminal can also be supplied externally with information or acquire desired information by use of the interface options described further below.

The information is then forwarded from the central communication terminal to the respective user(s), in that first of all the presence of the communication terminal of the respective user at a location or in a specific spatial locality around the location of an interface device and/or output device of the central communication device is determined. That is to say, it is determined for example whether the user, or the communication terminal carried by said user respectively, is located in the vicinity of the output device, or whether for example the communication terminal is located within range of a wireless interface, or for example is inserted in a plug-in receptacle with an interface.

As soon as it is established that the communication terminal or the user respectively is located at the location or in the selected locality, the stored information assigned to the user is either transmitted by the central communication device via the interface device to the communication terminal of the user, or alternatively the information for the respective user is output by way of the output device of the central communication device. The output may be performed acoustically, as a printout or graphically on a display, or combined in various ways. It is of course possible both for the information to be transmitted to the communication terminal and for the information to be output on the central communication device at the same time.

For this purpose, a central communication device for carrying out such a method must first of all have a first memory for storing registration data of communication terminals of the users belonging to the user group, as well as a second memory for storing information for the users. The memories may of course also be memory areas of an overall memory. Furthermore, the central communication terminal requires a device for assigning the information to the specific users or to a subgroup of the user group or to the whole user group. Furthermore, the device must have a way by which the presence of a registered communication terminal at the location or in a specific spatial locality around the location of an interface device and/or output device of the central communication device can be determined. In addition, the central communication device requires an appropriate device for transmitting the information assigned to a user via the interface device to the communication terminal of the user, provided that the user is determined as present. Further, it requires a device for outputting the information waiting for the user in each case by way of the output device respectively.

The presence of a communication terminal of a specific user can be determined in different ways and at different times.

In one embodiment, in each case the presence of a communication terminal of a specific user is automatically determined whenever information is assigned to the specific user in the central communication device, for example when information is stored for the user by another user.

In another embodiment, for determining the presence of a communication terminal, the communication terminal is logged onto the central communication device as soon as it is located at the location or in the specific locality around the location of the interfaces or output device. Likewise, it is accordingly logged off when it is removed from the location or from the locality. In the central communication device it is then centrally recorded at all times which communication terminals are currently logged off or logged on.

The logging on and logging off can be performed either by an active operation of the user or else automatically. In one exemplary embodiment, in each case a log-on or log-off signal respectively is actively transmitted by the user of the communication terminal to the central communication device. This may be performed, for example, via a short-range interface, e.g. a Bluetooth, IrDA or ultrasound interface. Another possibility is that the central communication terminal has as an interface device a contact interface, arranged for example within a receptacle shell, into which the communication terminal of the user is inserted or placed when present. In this case, therefore, the logging on is performed automatically when the communication terminal is connected to the contact interface of the central communication device, and the logging off is likewise performed automatically when the contact is removed, for example on withdrawal from the receptacle shell.

If contact interfaces are used for the individual communication terminals of the users, e.g. in the form of receptacle shells, the central communication device preferably has a separate contact interface for each communication terminal of each user. In this case, said receptacle shells preferably also simultaneously have the function of a charging unit, that is to say, when a communication terminal is inserted, the battery of the device is charged at the same time. This forces users to log on regularly. To keep the system expandable, the central communication device is preferably of modular design, that is to say it is possible to couple a plurality of contact interfaces in parallel. This is possible, for example, by using a suitable expandable BUS system for connecting the contact interface modules to one another and to the main unit of the central communication device.

If a wireless interface device is used, the locality around the location of the interface device preferably correlates to the range of the interface. Here, too, a logging on and logging off can be performed automatically, for example by the central communication terminal interrogating at regular intervals which of the registered communication terminals are within range of the wireless interface. The communication terminals then have the status of logged on, and a communication terminal that no longer responds automatically has the status of logged off.

In a further embodiment, all communication between the central communication terminal and the communication terminals of the users is performed by means of a mobile radio system, for example GSM or UMTS. For this purpose, the communication terminals must of course be mobile radio devices or other devices that can be contacted by use of mobile radio. Likewise, the central communication device must have a mobile radio access, possibly also via a fixed network interface. In this case a specific locality around the communication terminal or an output device respectively, for example a display or a voice output of the central communication terminal, is defined. Then the location of each communication terminal is determined, within the mobile radio network or via GPS for example. Finally, it is determined whether the respective communication terminal is located inside or outside the defined locality. The device then accordingly has the status of present and logged on, or logged off.

The transmitted information may be information that was input by a user at the central communication device for another user or a user group. Likewise, it may be information that was determined automatically by the central communication device for example, e.g. from the Internet, via WAP or the like, for a specific user or the user group. The information is then transmitted unilaterally to the communication terminal.

It is of course likewise possible for the respective user to transmit information for other users of the user group to the central communication device via his communication terminal. This is preferably performed either during logging on or logging off, or when the central communication device transmits information to the communication terminal of the user. In this way, a synchronization is preferably also performed between databases of the central communication device and the respective communication terminal of the user, wherein the databases may in particular be appointments diaries or address lists. In this way it is extremely easy to coordinate appointments relating to various members of the user group with each other, record them at the same time, and remind the individual members of them.

As an output device, the central communication device preferably has a display and a voice output. Optional provision is made for a keyboard to be attached via a keyboard interface so that text messages can be entered easily on the central communication device by use of the keyboard.

Further optional components for the central communication device are an interface to a telephone fixed network, a device for connecting an in-house telephone system as well as a mobile radio transmitting/receiving device.

In this case the central communication device preferably also has a device for switching over calls arriving on the one line, for example in the fixed network, to another line, for example the mobile radio network or the in-house system. In this way a connection between all communication systems is possible, so that the central communication device also serves simultaneously as a universal switching center.

Via the aforesaid interfaces it is also possible with the central communication device to receive information from the Internet or via WAP, and to communicate it as desired via e-mail, SMS or voice.

Moreover, in these cases, when inputting the information into the central communication device, the person who stores information for another user can select whether said message is to be transmitted immediately, via SMS for example, to the communication terminal of the recipient of the message, if the communication terminal is not present or logged off, or whether the message is to be stored first of all in the central communication device and only transmitted to the communication terminal of the respective user, or output on the output of the central communication device for the user respectively, as soon as the respective user logs on or is registered as present.

With a particularly convenient central communication device having a fixed network interface, when a communication terminal of a user is logged off, it is additionally possible to automatically switch a call diversion of all calls arriving for said user to the communication terminal (provided that said terminal is a mobile radio device) or to another subscriber line chosen by the respective user.

In another particularly preferred embodiment, the central communication device has the capability of establishing, by way of a command, for example by pressing a single key, a conference circuit to the mobile radio devices of the members of the user group via the fixed network interface or the mobile radio transmitting/receiving unit, whereby at least all the mobile radio devices that are logged off are contacted, that is to say all the members of the user group who are not located within a given range around the central communication device.

Instead of communicating over a mobile radio network by use of a separate mobile radio transmitting/receiving unit, the central communication device is also able to communicate over a mobile radio network by way of a communication terminal of a user determined as present, provided that the terminal is a mobile radio device. SMS messages can thus be transmitted or received, for example via the interface and the mobile radio device, or else calls can be performed. Since as a rule at least the user who is currently operating the central communication device is located with his mobile radio device at the location, such a connection capability is virtually always available, so that in principle it is also possible to dispense with a separate mobile radio transmitting/receiving unit of the central communication device.

In a further preferred embodiment, various function parameters of the communication terminal of the user are changed over automatically during logging on of a communication terminal of a user with the central communication device, for example on insertion into the receptacle. For instance, if the communication terminal is a mobile radio device, special call diversions are activated, filters set etc. that enable the user to be contactable for specific callers only. It is likewise possible to select specific ring tones. The changeover of the function parameters in the mobile radio device can either be performed actively by corresponding control commands of the central communication device as soon as the mobile radio device is logged on. The changeover can of course also be performed by the mobile radio device itself as soon as it is logged on.

In addition, all calls arriving at the mobile radio device can be automatically forwarded to the in-house system. It is likewise possible for a user to telephone using the in-house system either over the fixed network or over the mobile radio network.

BRIEF DESCRIPTION OF THE DRAWINGS

The invention is explained in greater detail below on the basis of an exemplary embodiment with reference to the attached drawings. The features represented there and the features already described above may be fundamental to the invention not only in the combinations stated, but also individually or in other combinations. It is expressly stated at this point that features which are only stated in connection with the method may also likewise be fundamental to the invention with respect to the central communication device for carrying out the method and vice versa.

The single figure shows a schematic diagram of a central communication device 1 according to the invention which is also referred to in the text below as "central station" 1 for short. The text below also assumes the use of mobile radio devices 2 as communication terminals 2 of the user by way of example.

DETAILED DESCRIPTION OF THE PREFERRED EMBODIMENTS

In the exemplary embodiment illustrated, the central station 1 is of modular design and has a main unit with a display 3, a loudspeaker 4, a microphone 9, as well as various buttons 5 for controlling a menu on the display 3.

Connected to the central station 1 by way of an expandable BUS system are a plurality of contact interfaces 6, also referred to in the text below as receptacles 6, into which mobile radio devices 2 of the individual users of the user group can be inserted in each case. In the exemplary embodiment illustrated, the group consists of three members. Accordingly, three receptacles 6 are connected to the central station 1. With this exemplary embodiment, up to four receptacles 6 can be connected in total. The receptacles 6 also simultaneously serve as charging stations for the batteries of the inserted mobile radio devices 2.

A keyboard 8 is connected to the central station 1 via a keyboard interface 7. Said keyboard interface 7 may be a wireless interface. The keyboard 8 is however preferably connected via the interface 7, wherein the keyboard 8 is one which can also be plugged directly into a mobile radio device 2.

The central station 1 also has a fixed network interface 10 (e.g. analog or ISDN), as well as an interface device 11 for connection to an in-house telephone system 12, 13, 14. It makes no difference here whether the telephone system connected to the interface device 11 is a single conventional telephone, a telephone system having a plurality of extensions, or a cordless telephone or telephone system. In the exemplary embodiment illustrated, it is a cordless system 13, 14 conforming to the DECT standard. An answering machine 12 is likewise connected.

The central station 1 forms a communication and information platform for a small group that uses a shared house or office, for example a family. Owing to the various interfaces 10, 11, the central station 1 also forms a sort of adapter between a fixed network interface 10, the mobile radio devices 2 inserted in the receptacles 6 and the in-house telephone system 12, 13, 14.

Messages for other members of the user group or subgroups or the whole user group can be stored by various members of the user group by means of the keyboard 8. This is accomplished by way of storage in a corresponding information memory, wherein the information is assigned in each case to the members of the group or the whole group or subgroup. Furthermore, via the fixed network interface 10 it is possible to request information from the Internet or via WAP, for example services relating to weather, shares, events etc., automatically or by way of appropriate operation. Current offers from stores in the immediate vicinity can also be automatically received and presented on the display by means of WAP or SMS, or stored as information for specific members of the user group. The same naturally applies to e-mails or voice messages. It is likewise possible to transmit SMS, e-mail or other messages at any time via the central station 1.

The information is stored for a user in the central station 1 until said user inserts his mobile radio device 2 into the corresponding receptacle 6. On insertion, the mobile radio device 2 of the respective user is automatically logged on to the central station 1. The mobile radio device 2 is logged off automatically when the mobile radio device 2 is removed from the receptacle 6.

Depending on the type of information, or according to the wishes of the sender of the information, following logging on all the information stored for the respective user in the interim since the last log-on is then presented on the display 3 of the central station 1 or output via the loudspeaker 4. In addition or alternatively, said information can be transmitted to the mobile radio device 2 of the user. Alternatively or in addition—for example in the case of important messages that should reach the respective recipient immediately—the information can also be transmitted directly, for example in the form of an SMS message.

It is furthermore possible that on logging on, a synchronization of various files is performed between the central station 1 and the mobile radio device 2 of the user. In particular, a synchronization of databases such as appointments diaries and address lists is possible.

In the present exemplary embodiment, therefore, an appointments diary is present in the memory of the central station 1, in which diary all the appointments of the individual members of the group are recorded.

When a mobile radio device 2 of a user logs on, all appointments which the user has entered n his mobile radio device 2 since the last log-off are then transmitted to the group appointments diary in the central station 1. Conversely, all the appointments relating to the respective user of the mobile radio device 2 which have been entered in the appointments diary of the central station 1 since the log-off of the mobile radio device 2 of the user are transmitted to the mobile radio device 2.

When the mobile radio device 2 is inserted into the receptacle 6, if wished by the user it is also possible for special call diversions, filters etc. to be automatically set in the mobile radio device 2 which are specifically provided for the situation where the respective user is located in the vicinity of the central station, for example at home. This makes it possible, for example, to be contactable only for specific callers (identified by CLIP), or to select special ring tones.

As soon as a mobile radio device 2 of a user has been inserted into a receptacle 6, the central station 1 can also communicate via the mobile radio device 2 over the mobile radio network. This means mobile radio callers can continue to be received on the mobile radio device 2 and be forwarded via the central station 1 to the in-house telephone system. Calls that arrive on the mobile radio device 2 are passed through to the connected telephone system 13, 14 or to the answering machine 12 as if the call had come from a fixed network. In this case the central station 1 quasi-simulates the fixed network. In this respect, in principle the central station can also be used without a fixed network interface 10. A version of this type is a converter from the mobile radio network to a conventional telephone system. This is particularly of interest for locations at which no fixed network interface is available, but where a normal in-house telephone system is wanted.

In the exemplary embodiment illustrated, it is also possible either to telephone from the in-house system 13, 14 over the fixed network, or to telephone out over the mobile radio network for example via a special signal (e.g. a prefix *99) via a mobile radio device 2 inserted into a receptacle 6. The advantage of this concept is that costs can be saved if someone can be contacted more cheaply over the mobile radio network than over the fixed network. In addition, it is possible to obtain a free connection over the mobile radio network when all fixed network lines are busy.

In principle the central station 1 does not intervene in the fixed network line (a/b line) as long as no call is accepted or transmitted over the mobile radio network. For this reason, all functions such as charge pulses, CLIP, fax, modem etc. for example continue to be supported as before. In the case of incoming calls, it is therefore possible to display the number on the house telephone by means of CLIP, wherein it is possible to signal by corresponding prefixing of a number combination whether the call has come over the mobile radio network or over the fixed network.

In the present exemplary embodiment, an incoming mobile radio call is first signaled by the mobile radio device 2. After a specific period of time, for example five seconds, the call is forwarded via the central station 1 to the in-house system 13, 14. If the call is picked up, the two lines are connected. If it is not picked up, the user can decide whether the mailbox of the mobile radio network should take over the call or whether it should be picked up by the answering machine 12 connected to the in-house system 12, 13, 14. This is possible by appropriate setting of the mobile radio network call diversion for example.

In addition to control via the keyboard or the menu control buttons 5 respectively, it is also possible to control the central station by use of a built-in voice controller. The central station 1 naturally also has a hands-free facility so that calls can also be conducted directly at the central station 1.

Via a special conference key, with a single keypress, it is possible to contact all mobile radio devices 2 of the members of the user group which are not located in the receptacles 6 at this time for a conference circuit. Communication among all members of the group is thus possible at any time in an extremely simple and user-friendly way.

In a further exemplary embodiment not illustrated, the central station has a telematics module as a further module, with which various domestic appliances can be controlled over the telephone. In this case they can be controlled via a fixed network interface, or via a mobile radio transmitting/receiving module, or via mobile radio using a mobile radio device inserted into a receptacle unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for transmitting information within a user group, wherein communication terminals are assigned to the individual users of the user group, comprising the steps of:
   registering the communication terminals of the users belonging to the user group with a central communication device;
   storing information in the central communication device, wherein the information is assigned to at least one of the whole user group, a subgroup and specific individual users of the user group;
   at least one of transmitting the information assigned to a user of a communication terminal from the central communication device to the communication terminal via an interface device of the central communication device and outputting the information for the respective user via an output device of the central communication device;

determining the presence of a registered communication terminal at least one of a location and in a specific spatial locality around the location of at least one of the interface device and the output device of the central communication device, wherein at least one of the transmission and output of the information is performed if the communication terminal of the respective user is determined as present or as soon as the communication terminal of the respective user is determined as present, wherein the information is stored for at least one of the whole user group, a subgroup, and specific individual users of the user group in the central communication device by use of a keyboard connected to the central communication device.

2. The method as claimed in claim 1, wherein the presence of a communication terminal of a specific user is automatically determined whenever information is assigned to the specific user in the central communication device.

3. The method as claimed in claim 1, wherein, for determining the presence of a registered communication terminal, the communication terminal is logged onto the central communication device as soon as it is located at at least one of the location and in the specific locality around the location of at least one of the interface device and output device, and is logged off when it is removed from at least one of the location and the locality.

4. The method as claimed in claim 3, wherein at least one of the logging on and logging off of a communication terminal with the central communication device is performed by way of at least one of a log-on and log-off signal respectively transmitted by the communication terminal to the central communication device, wherein the transmission of at least one of the log-on and log-off signal respectively is actively triggered by the user of the communication terminal.

5. The method as claimed in claim 3, wherein the at least one of logging on and logging off of the communication terminal of the user is performed automatically by the central communication device.

6. The method as claimed in claim 1, wherein the interface device of the central communication device comprises a contact interface to the communication terminal of the user.

7. The method as claimed in claim 1, wherein the interface device of the central communication device comprises a short-range wireless interface, and the locality around the location is correlated to the range of the interface.

8. The method as claimed in claim 1, wherein, at least one of during the transmission of information from the central communication device to the communication terminal and during a logging onto the central communication terminal, a communication terminal transmits information for at least one of the user group, a subgroup and a specific user of the user group to the central communication device.

9. The method as claimed in claim 1, wherein the information transmission between the central communication device and the communication terminal comprises a database synchronization.

10. The method as claimed in claim 9, wherein the database comprises an appointments diary.

11. The method as claimed in claim 1, wherein the communication terminals of the users are mobile radio devices.

12. The method as claimed in claim 11, wherein a logged on communication terminal of a user is used to at least one of transmit and receive information from the central communication device via a mobile radio network.

13. The method as claimed in claim 11, wherein the central communication device has a fixed network interface and calls of the user group arriving for a user on the fixed network interface are automatically diverted to at least one of the mobile radio device of the user and to another predetermined line when the mobile radio device of the user is logged off from the central communication device.

14. The method as claimed in claim 12, wherein, by use of only one command, a telephone conference circuit is switched from the central communication device at least to all the communication terminals of the users of the user group who cannot be determined as present.

15. The method as claimed in claim 1, wherein a function parameter of the communication terminal is changed over automatically during at least one of logging on and logging off of a communication terminal of a user with the central communication device.

16. A central communication device for carrying out a method for transmitting information within a user group, comprising:

a first memory for storing registration data of communication terminals of users belonging to the user group;

a second memory for storing information for the users;

means for assigning the information to at least one of a user group, a subgroup of the user group and specific individual users of the user group;

means for determining the presence of a registered communication terminal at at least one of a location and in a specific spatial locality around the location of at least one of an interface device and an output device of the central communication device;

means for at least one of transmitting the information assigned to the user of the communication terminal determined as present via the interface device to the communication terminal and for outputting the respective information by way of the output device; and a keyboard connected to the central communication device for storing information in the second memory.

17. A communication device as claimed in claim 16, wherein the interface device comprises a short-range wireless interface for data exchange with a communication terminal of a user.

18. A communication device as claimed in claim 16, wherein the interface device comprises a contact interface for a communication terminal of a user.

19. A communication device as claimed in claim 18, wherein a contact interface is available for every communication terminal of every user.

20. A communication device as claimed in claim 18, wherein the contact interface includes a connection for charging a battery of the communication terminal.

21. A communication device as claimed in claim 16, wherein the communication device includes a fixed network interface.

22. A communication device as claimed in claim 16, wherein the communication device includes a mobile radio transmitting/receiving device.

23. A communication device as claimed in claim 16, wherein the communication device includes a device for connecting an in-house telephone system.

24. A communication device as claimed in claim 16, wherein the communication device includes means for forwarding calls between at least one of a mobile radio transmitting/receiving device, a fixed network interface and an in-house telephone system.

25. A communication device as claimed in claim 16, wherein the output device comprises at least one of a display and a voice output unit.

26. A communication device as claimed in claim 16, wherein the communication device includes a keyboard interface.

27. A communication device as claimed in claim 16, wherein the communication device includes a voice control device.

28. A communication device as claimed in claim 16, wherein the communication device includes a telematics device for the remote control of devices connected to the telematics device via at least one of a communication terminal of a user and via a fixed network interface.

29. A communication device as claimed in claim 16, wherein the communication device includes means for logging on a registered communication terminal with the central communication device as soon as it is located at at least one of the location and in the specific locality around the location of at least one of the interface device and output device, and for logging off the communication terminal when it is removed from at least one of the location and from the locality.

30. A communication device as claimed in claim 29, wherein the communication device includes means for the automatic changeover of a function parameter of a communication terminal of a user during at least one of logging on and during logging off of the communication terminal with the central communication device.

31. The method as claimed in claim 2, wherein, for determining the presence of a registered communication terminal, the communication terminal is logged onto the central communication device as soon as it is located at at least one of the location and in the specific locality around the location of at least one of the interface device and output device, and is logged off when it is removed from at least one of the location and the locality.

32. The method as claimed in claim 4, wherein the at least one of logging on and logging off of the communication terminal of the user is performed automatically by the central communication device.

33. The method as claimed in claim 12, wherein the central communication device has a fixed network interface and calls of the user group arriving for a user on the fixed network interface are automatically diverted to at least one of the mobile radio device of the user and to another predetermined line when the mobile radio device of the user is logged off from the central communication device.

34. The method as claimed in claim 13, wherein, by use of only one command, a telephone conference circuit is switched from the central communication device at least to all the communication terminals of the users of the user group who cannot be determined as present.

35. The method as claimed in claim 2, wherein the interface device of the central communication device comprises a contact interface to the communication terminal of the user.

36. The method as claimed in claim 2, wherein the interface device of the central communication device comprises a short-range wireless interface, and the locality around the location is correlated to the range of the interface.

37. The method as claimed in claim 2, wherein, at least one of during the transmission of information from the central communication device to the communication terminal and during a logging onto the central communication terminal, a communication terminal transmits information for at least one of the user group, a subgroup and a specific user of the user group to the central communication device.

38. The method as claimed in claim 2, wherein the information transmission between the central communication device and the communication terminal comprises a database synchronization.

39. A communication device as claimed in claim 17, wherein the interface device comprises a contact interface for a communication terminal of a user.

40. A communication device as claimed in claim 19, wherein the contact interface has a connection for charging a battery of the communication terminal.

* * * * *